United States Patent [19]

Fetsch

[11] 4,425,933
[45] Jan. 17, 1984

[54] LOW DENSITY STOP FLOAT TRAP

[75] Inventor: Joseph T. Fetsch, Fort Salonga, N.Y.

[73] Assignee: Hydratron Fuels, Inc., Freeport, N.Y.

[21] Appl. No.: 259,235

[22] Filed: Apr. 30, 1981

[51] Int. Cl.³ ............................................. B05G 5/00
[52] U.S. Cl. ............................... 137/172; 137/236 R
[58] Field of Search ............... 137/236, 172; 405/53; 220/18

[56] References Cited

U.S. PATENT DOCUMENTS

| | | | |
|---|---|---|---|
| 2,204,998 | 6/1940 | Ryan | 137/172 X |
| 2,551,404 | 5/1951 | Wiggins | 137/172 X |
| 3,940,940 | 3/1976 | Barrett | 137/212 X |
| 4,209,267 | 6/1980 | Gnaedinger | 137/312 X |

Primary Examiner—Alan Cohan
Attorney, Agent, or Firm—Schwartz, Jeffery, Schwaab, Mack, Blumenthal & Koch

[57] ABSTRACT

A system for storing an organic liquid such as fuel oil comprising a tank surrounded by a containment structure forming a moat to hold any organic liquid which leaks from the tank. A drain opening is formed in the containment structure and is connected through a drain pipe to a trap. The trap houses a float actuated valve. The float actuated valve includes a valve member which has a specific gravity greater than the organic liquid fluid but less than that of water so that the float actuated valve allows water to escape from the containment structure while preventing escape of any organic liquid.

11 Claims, 2 Drawing Figures

LOW DENSITY STOP FLOAT TRAP

BACKGROUND OF THE INVENTION

1. Field of the Invention

This invention relates to systems for storing organic liquids such as fuel oil and the like, and especially to such systems which are adapted to ensure that the organic liquid is not accidentally allowed to escape into and contaminate the environment.

2. Discussion of Related Art

Fuel oil storage facilities customarily comprise a number of tanks in which fuel oil is contained. Occasionally, leaks occur which allow the stored fuel oil to escape into the surrounding environment. If such a leak goes undetected, relatively severe environmental damage to, for example, ground water may occur. Consequently, it is desirable to provide a secondary containment structure around each tank in order to trap any escaping fuel oil.

One type of structure which is useful to contain escaping fuel oil is a wall or dike erected to form a moat around an associated storage tank. However, a problem which arises with such a moat is that water, e.g., rain, condensation and the like, can accumulate in the moat, thereby reducing its capacity for holding fuel oil in the event of a leak.

Accordingly, it is necessary to provide a mechanism which will allow water to drain freely from the moat yet will retain any leaked fuel oil in the containment area.

Several valving mechanisms for separating fluids of varying densities have been suggested. Huiet, Jr., U.S. Pat. No. 4,051,030, and Moyer, U.S. Pat. No. 3,115,888, disclose float valves with floats having a density intermediate oil and water located above the valve inlet opening. The float of Huiet acts as a seal for the outlet at the bottom of the float chamber while the float of Moyer is located at the end of a pivot arm which operates a butterfly valve in the outlet line. However, the valves disclosed in each of these references are designed to be located in a sump at the bottom of an oil tank and are not adapted for use in a moat surrounding such a tank.

Olsen, U.S. Pat. No. 3,745,115, shows an oil and water separating chamber provided with two valves operated by floats which float at the interphase between the oil and the water in the separation chamber. One of the valves is a slide valve having an opening below the level of the float which allows water to escape from the bottom of the chamber. The other valve is a pivot valve having an opening above the level of the float which allows oil to escape from the top of the chamber. Again, this device is not adapted for use in a moat surrounding a storage tank.

McKee, U.S. Pat. No. 3,675,771, discloses a water surge tank with a floating drain line which maintains a constant layer of oil on top of water with float operated switches for starting and stopping the flow of water out of the tank so that the water level is constantly raised and lowered in the tank. This mechanism also does not lend itself to use with a moat surrounding a storage tank in that it allows a significant amount of water to remain unpurged.

SUMMARY OF THE INVENTION

A primary object of the present invention is to provide an organic liquid containment system which includes a storage tank and which allows rain water and the like to be passed to the surrounding environment yet retains any organic liquid which leaks from the storage tank.

A further object of the present invention is to provide an organic liquid containment system which utilizes a float trap for separating rain water and the like from leaked organic liquid.

Another object of the present invention is to provide an organic liquid containment system in which the float trap is scavengable.

Yet another object of the present invention is to provide an organic liquid containment system utilizing a float trap wherein the float trap is easily testable to ensure proper operation. The float trap is contained beneath the surface of the earth and, therefore, must contain a simple mechanism to enable manual testing thereof.

An even still further object of the present invention is to provide an organic liquid containment system incorporating a float trap wherein the float trap is protected during freezing weather so that any water contained therein will not freeze and inhibit operation of the trap.

In accordance with the above and other objects, the present invention includes a tank for containing an organic liquid such as fuel oil or other hydrocarbons. A containment structure is formed around the tank and includes a drain opening formed in the base thereof. The drain opening leads through a drain pipe to a subterranean trap. The trap is disposed below the earth's frost line in order that any water contained therein will not freeze during the winter. The trap is also placed in a position spaced horizontally from the end of the containment structure in order that it can be accessed without undermining the containment structure.

The trap contains a float actuated valve which includes a float member. The float member has a specific gravity which is slightly greater than the specific gravity of the organic liquid but is less than that of water. Accordingly, the float level will rise as the trap becomes filled with water but will remain stationary if the trap is filled with the organic liquid. The float is connected through a float arm to a valve member positioned in a valve seat. When the float rises due to an increase in water level, the valve member is pulled from the valve seat allowing water to drain. As the water level decreases, the float moves down and closes the valve member, thereby retaining the organic liquid.

An access tube extends from the trap to a position above the containment structure. A test rod is disposed in the access tube in alignment with the float. Accordingly, the test rod can be forced downwardly into contact with the float, thereby forcing the float down to test closure of the valve member. A chain is connected between the float and test rod. Accordingly, the test rod can be pulled upwardly drawing the float with it to test opening of the valve member.

BRIEF DESCRIPTION OF THE DRAWINGS

The above together with other objects and advantages of the present invention will become more readily apparent as the invention is more fully described in the following detailed description, reference being had to the attached drawings which form a part thereof and in which like reference numerals represent like or similar parts throughout and wherein.

DETAILED DESCRIPTION OF A PREFERRED EMBODIMENT

Figures 1, 2:
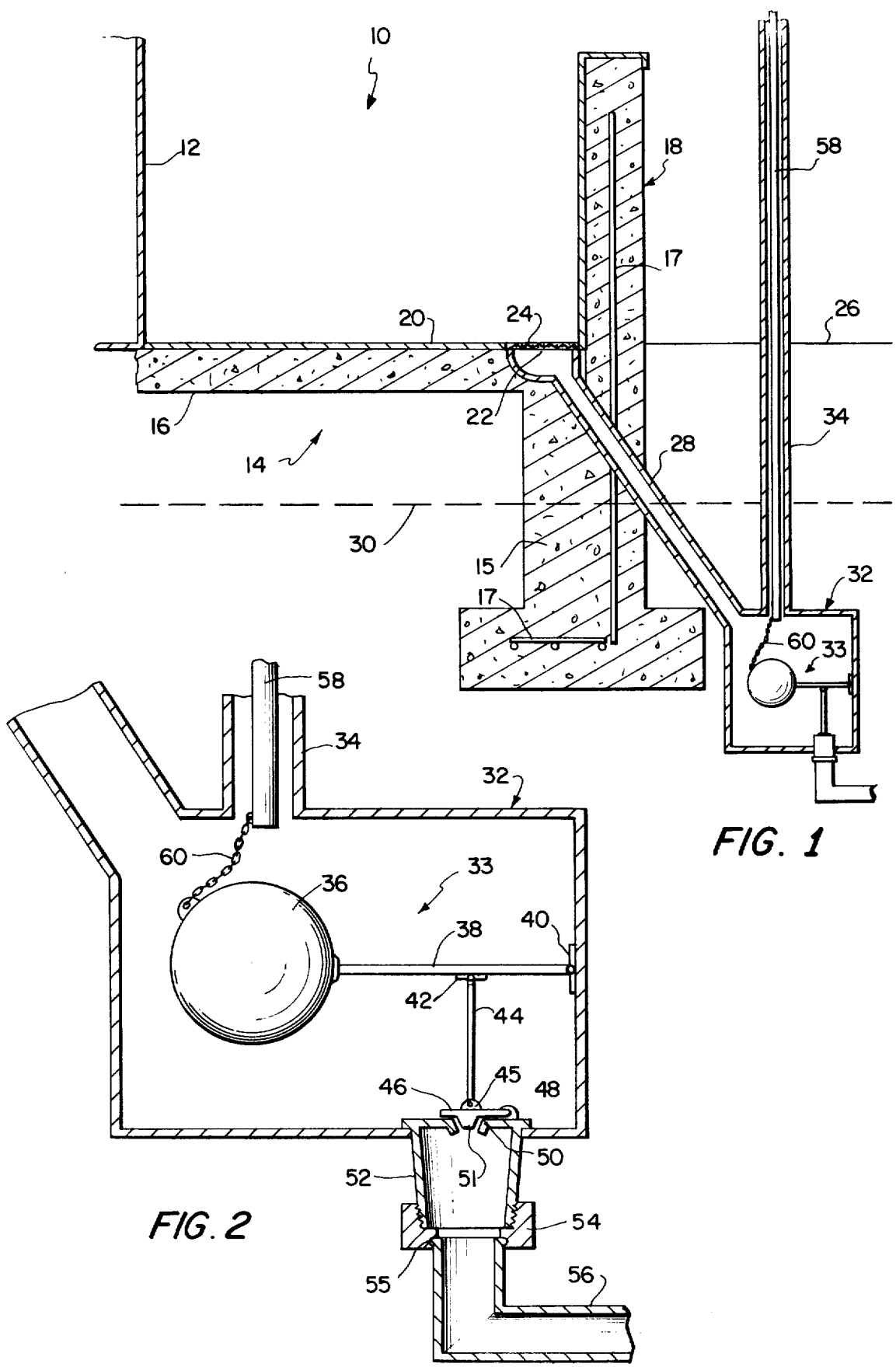
FIG. 1 is an elevational sectional view of the liquid containment system of the present invention.
FIG. 2 is an enlarged view of the trap of the present invention.

With reference to the drawings, a liquid containment system incorporating the principles and concepts of the present invention and generally referred to by the numeral 10 will be described in detail. System 10 includes a liquid storage tank 12 which can be of any conventional design and is adapted to contain organic liquids such as conventional fuel oil. Ideally, the organic liquid stored in tank 12 will remain in the tank until removed for use or further distribution. However, due to age, poor design, natural catastrophe or other defects, some of the organic liquid within tank 12 may inadvertently leak therefrom. Accordingly, containment structure 14 is provided around the periphery of tank 12 in order to confine any leaked organic liquid and keep such organic liquid from contaminating the surrounding environment. A single containment structure 14 may be used to surround any number of tanks 12, or a separate containment structure 14 may be used with each individual tank 12 in order to isolate and identify a single tank which has developed a leak. The containment volume of the containment structure should be at least equal to the volume of the largest single tank therein in order to effectively be able to contain the entire contents of the tank if necessary.

Containment structure 14 includes base 16 and wall 18 which are supported by footing 15. The base 16 is preferably a flat slab of poured, formed concrete and should preferably contain reinforcing bars 17. Base 16 can extend beneath tank 12 to provide a support for the tank, but must then have footings below the frost line. Wall 18 is formed integrally with footing 15. Wall 18 and footing 15 are preferably formed from concrete and should contain reinforcing bars 17. Footing 15 may have a ledge shown at 17 which extends beneath and supports base 16. A lining 20 is applied to the inner surface of base 16 and wall 18 to prevent spill penetration from containment structure 14 to ground waters. Lining 20 may comprise a coating of polysulfide epoxy or any similar material. Also, polysulfide expansion joints are inserted at all breaks such as the connection between base 16 and wall 18. Lining 20 ensures that containment structure 14 is sufficiently imperforate to contain organic liquids safely without any fear of contaminating the environment.

However, as discussed above, rainwater, condensation or the like may build up within containment structure 14. Accordingly, a drain opening 22 is formed at one end of base 16. Base 16 may have an appropriate pitch to ensure that any water build-up within containment structure 14 will be channeled to drain opening 22. Drain opening 22 is preferably provided with a screen or grating 24 which keeps debris such as dirt, leaves or the like from entering the drain opening.

All liquid entering drain opening 22 is channeled through drain pipe 28 to trap 32. Trap 32 may be disposed directly beneath drain opening 24 but preferably drain pipe 28 is inclined outwardly from containment structure 14 in order that trap 32 may be disposed below and horizontally away from containment structure 14. In this manner, if it is necessary to gain access to trap 32, a hole can be dug directly through the earth's surface 26 to trap 32 without undermining any portion of containment structure 14.

Trap 32 contains a float valve mechanism 33 which operates to remove water which has accumulated to a predetermined height within the trap. Inasmuch as a certain amount of water will most likely be contained within trap 32 at any given time, it is preferable that trap 32 be buried in the earth below the earth frost line shown by broken line 30 in FIG. 1. The earth frost line is normally approximately 3 feet below the earth's surface 26. Furthermore, the size of drain pipe 28 should be kept sufficiently small to prevent cold air from circulating and removing enough ground heat from trap 32 to allow water left in the trap to freeze. It may also be desirable to include baffles (not shown) in drain line 32 to further restrict entry of cold air to reduce the likelihood of water freezing in trap 32.

With reference to FIG. 2, the construction of float valve 33 will now be set forth. Float valve 33 includes a float member 36 which is fixedly attached to a float arm 38. Float arm 38 is pivotally attached through a hinge 40 to the interior of trap 32. Accordingly, float member 36 is free to move up and down inside trap 32 depending on the level of water contained therein. Float member 36 is designed to float only on water. The specific gravity of fuel oil and other organic liquids is generally somewhat less than water. Accordingly, float member 36 must be formed to have a specific gravity slightly less than water but slightly greater than the organic liquid to be stored in tank 12. In this manner, float member 36 rises only in response to an accumulation of water in trap 32 and remains stationary in response to an accumulation of organic liquid from tank 12.

Float arm 38 is pivotally connected to actuator arm 44 at hinge 42. Similarly, actuator arm 44 is pivotally connected at hinge 45 to valve member 46. Such an arrangement provides sufficient mechanical advantage to assure tight closure of the valve assembly. Valve member 46 seats on valve seat 50 but may be removed from valve seat 50 by upward movement of arm 44 which causes valve member 46 to pivot about hinge 48. Accordingly, when float member 36 rises in response to an accumulation of water, valve member 46 becomes unseated, and water may exit trap 32 through housing 52 and drain pipe 56. When insufficient water is in trap 32 to cause float member 36 to rise, the weight of float member 36 forces valve member 46 to positively seat on valve seat 50, thus ensuring that no liquid will exit from trap 32.

Housing 52 is connected to drain pipe 56 through threaded connector 54. Pipe 56 swivels in connector 54 at swivel connection 55. Accordingly, when pipe 56 is installed, it can be directed toward any convenient dry well, storm drain or the like.

Inasmuch as valve 33 may not be operated often, it is desirable to have a mechanism whereby the valve can be tested at periodic intervals to ensure its functional capabilities. Such an apparatus is shown in FIGS. 1 and 2 to comprise access pipe 34 which upwardly extends from trap 32 through the earth's surface 26 to a position above the top of containment structure 14. It is necessary that the end of pipe 34 maintain this height so that any liquid leaking from tank 12 cannot exit through pipe 34 and contaminate the environment. A test rod 58 is disposed through pipe 34. Pipe 34 and test rod 59 are aligned with float member 36. Accordingly, if one desires to test the closure of valve member 46, liquid should be introduced into drain 22 and rod 58 should then be forced downwardly. Rod 58 engages float member 36 forcing it downwardly. If valve 33 is operating properly, valve member 46 seats on valve seat 50 and no liquid should exit from trap 32. If valve seat 33 is not operating properly, liquid will be seen to recede in drain pipe 28 or to flow from the outlet end of pipe 56.

Further, a chain 60 is connected between the lower end of rod 58 and float 36. If opening operation of valve 33 is to be tested, liquid should be introduced into opening 22 and rod 58 pulled upwardly. Float 36 will also move upwardly through the action of chain 60 thus pulling valve member 46 from seat 50. If valve 33 is operating properly and no clogging of the system is present, liquid will be seen receding in drain pipe 28 or exiting from the outlet end of pipe 56.

Another important feature of the present invention which should be noted is the fact that valve member 46 is disposed below float 36. Accordingly, when the boundary between leaked organic liquid and the water descends across float member 36, closure of valve member 46 will occur well before the level of leaked organic liquid reaches orifice 51. Consequently, no drainage of organic liquid from trap 32 will occur.

While the present invention has been illustrated and described in its preferred form, it will be understood that variations may be made therein without departing from the scope of the invention as set forth in the appended claims.

What is claimed is:

1. An apparatus for preventing contamination of the environment by a stored organic liquid, said organic liquid having a predetermined specific gravity, said apparatus comprising:
   a tank for containing said organic liquid;
   a liquid impervious containment structure surrounding said tank;
   a drain opening formed in said structure;
   drain valve means connected to said drain opening for distinguishing between said organic liquid and liquid having a greater specific gravity than said organic liquid, and passing said liquid having a greater specific gravity from said containment structure;
   wherein said drain valve means comprises a trap including a float actuated valve, said float actuated valve including a float member having a specific gravity less than water but greater than said stored organic liquid; and
   manual actuation means for manually actuating said float actuated valve.

2. The apparatus as set forth in claim 1, wherein said trap is disposed below the earth's surface.

3. The apparatus as set forth in claim 1 and further comprising means for covering said drain opening.

4. The apparatus as set forth in claim 1, wherein said manual actuation means comprises a connection to said float member.

5. The apparatus as set forth in claim 1, wherein said trap is disposed beneath the earth's surface, and further wherein said manual actuation means comprises a member accessible from above the earth's surface.

6. The apparatus as set forth in claim 1, wherein said manual actuation means comprises a first means for forcing said float member downwardly.

7. The apparatus as set forth in claim 6, wherein said manual actuation means includes a second means for forcing said float member upwardly.

8. The apparatus as set forth in claim 3, wherein said means for covering comprises a screen.

9. An apparatus for preventing contamination of the environment by a stored organic liquid, said organic liquid having a predetermined specific gravity, said apparatus comprising:
   a tank for containing said organic liquid;
   a liquid impervious containment structure surrounding said tank;
   a drain opening formed in said structure;
   drain valve means connected to said drain opening for distinguishing between said organic liquid and liquid having a greater specific gravity than said organic liquid, and passing said liquid having a greater specific gravity from said containment structure,
   wherein said drain valve means is spaced vertically below said containment structure and is spaced horizontally away from said containment structure whereby access may be had to said drain valve means without disturbing said containment structure.

10. An apparatus for preventing contamination of the environment by a stored organic liquid, said organic liquid having a predetermined specific gravity, said apparatus comprising:
    a tank for containing said organic liquid;
    a liquid impervious containment structure surrounding said tank;
    a drain opening formed in said structure;
    drain valve means connected to said drain opening for distinguishing between said organic liquid and liquid having a greater specific gravity than said organic liquid, and passing said liquid having a greater specific gravity from said containment structure, said drain valve means being disposed below the frost line in the earth to prevent freezing of accumulated water; and
    means disposed above the surface of the earth for testing the operative condition of said drain valve means.

11. An apparatus for preventing contamination of the environment by a stored organic liquid, said organic liquid having a predetermined specific gravity, said apparatus comprising:
    a tank for containing said organic liquid;
    a liquid impervious containment structure surrounding said tank;
    a drain opening formed in said structure;
    drain valve means connected to said drain opening for distinguishing between said organic liquid and liquid having a greater specific gravity than said organic liquid, and passing said liquid having a greater specific gravity from said containment structure;
    wherein said drain valve means comprises a trap including a float actuated valve, said float actuated valve including a float member having a specific gravity less than water but greater than said stored organic liquid; and
    wherein said trap is spaced vertically below said containment structure and is spaced horizontally away from said containment structure.

* * * * *